United States Patent
Zhong et al.

(10) Patent No.: US 7,317,851 B2
(45) Date of Patent: Jan. 8, 2008

(54) OPTICAL ADD/DROP PATCH CORD

(75) Inventors: Johnny Zhong, Union City, CA (US); Steve Wang, San Jose, CA (US); Ping Xie, Cupertino, CA (US); Kevin Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 97 days.

(21) Appl. No.: 10/724,471

(22) Filed: Nov. 26, 2003

(65) Prior Publication Data

US 2004/0114870 A1 Jun. 17, 2004

Related U.S. Application Data

(60) Provisional application No. 60/429,255, filed on Nov. 26, 2002, provisional application No. 60/429,467, filed on Nov. 26, 2002.

(51) Int. Cl.
G02B 6/26 (2006.01)
G02B 6/28 (2006.01)

(52) U.S. Cl. ............................ 385/24; 385/15; 385/46; 385/47; 385/48

(58) Field of Classification Search ................. 385/15, 385/47, 88, 92, 130, 24; 398/82, 83
See application file for complete search history.

(56) References Cited

U.S. PATENT DOCUMENTS

| | | | |
|---|---|---|---|
| 5,425,120 A * | 6/1995 | Peterson et al. ............... 385/87 |
| 5,652,814 A | 7/1997 | Pan et al. | |
| 5,754,718 A | 5/1998 | Duck et al. | |
| 5,781,681 A * | 7/1998 | Manning ...................... 385/86 |
| 5,786,915 A * | 7/1998 | Scobey ......................... 398/82 |
| 5,812,306 A | 9/1998 | Mizrahi | |
| 6,198,857 B1 * | 3/2001 | Grasis et al. .................. 385/24 |
| 6,296,400 B1 * | 10/2001 | Uchiyama et al. ............. 385/94 |
| 6,301,407 B1 * | 10/2001 | Donaldson .................... 385/34 |
| 6,388,783 B1 | 5/2002 | Weller-Brophy | |
| 6,634,801 B1 * | 10/2003 | Waldron et al. ............... 385/86 |
| 6,644,865 B2 * | 11/2003 | Chang et al. .................. 385/86 |
| 6,834,137 B2 * | 12/2004 | Pan et al. ...................... 385/18 |
| 7,001,081 B2 * | 2/2006 | Cox et al. ..................... 385/86 |
| 2002/0197008 A1 * | 12/2002 | Kim et al. ..................... 385/24 |
| 2004/0101247 A1 * | 5/2004 | Chen et al. .................... 385/47 |
| 2004/0109255 A1 | 6/2004 | Zhong et al. | |
| 2004/0109635 A1 | 6/2004 | Zhong et al. | |

* cited by examiner

*Primary Examiner*—Michelle R. Connelly-Cushwa
(74) *Attorney, Agent, or Firm*—Workman Nydegger

(57) ABSTRACT

An optical add/drop patch cord. The optical add/drop patch cord has an optical add/drop component enclosed by a casing. An input fiber is optically coupled to the optical add/drop component and permanently or detachably connected to the casing. A drop fiber is optically coupled to the optical add/drop component and permanently or detachably connected to the casing. An add fiber is optically coupled to the optical add/drop component and permanently connected to the casing. An output fiber is optically coupled to the optical add/drop component and permanently connected to the casing.

18 Claims, 2 Drawing Sheets

OPTICAL ADD/DROP PATCH CORD

CROSS-REFERENCE TO RELATED APPLICATION

This application claims the benefit of U.S. Provisional Application Nos. 60/429,255, titled OPTICAL ADD/DROP PATCH CORD and filed Nov. 26, 2002 and 60/429,467 titled A BATCHED PACKAGE PROCESS FOR CREATING OPTICAL BLOCKS FOR USE IN FORMING OPTICAL COMPONENTS and filed Nov. 26, 2002, which are incorporated herein by this reference.

BACKGROUND OF THE INVENTION

1. The Field of the Invention

The invention generally relates to multiplexed communication in fiber optic networks. More specifically, the invention relates to methods and apparatus for implementing a network using an optical add/drop module integrated in a patch cord device.

2. Description of the Related Art

Fiber optics are increasingly used for transmitting voice and data signals. As a transmission medium, light provides a number of advantages over traditional electrical communication techniques. For example, light signals allow for extremely high transmission rates or in other words, very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on copper conductor. Many conventional electrical networks are being upgraded to optical networks to take advantage of the increased speed and efficiency.

One goal of optical fiber networks is to maximize the amount of data traffic that can be transmitted along a single optical fiber. One way of increasing the amount of data traffic is by using various types of multiplexing arrangements. One such multiplexing arrangement is based on sending multiple signals through the same optical fiber using modulated carrier beams, each having a different frequency or wavelength than the other carrier beams. For instance, in one implementation known as coarse wavelength division multiplexing (CWDM), signals are sent using lasers with wavelengths varying between 1470 nm and 1610 nm in 20 nm increments. Each incremental wavelength represents a different data channel.

To accomplish a multiplexing implementation such as the one described above, several specialized data handling components are needed. One such component is an optical add/drop module, sometimes referred to as an OADM. An OADM extracts, or drops, a single channel from a multiplexed signal and provides the single channel to a network device that uses the channel. The network device utilizes the data, for example, carried by the dropped channel. In addition, a channel having the same wavelength as the dropped channel is added to the multiplexed optical signal using the OADM. The added channel may have the same or different data compared to the dropped channel. The multiplexed optical signal is then further propagated on the optical network after the drop and add operations have been performed.

A typical example of a common OADM is shown in FIG. 1. The optical add drop module (OADM) 100 has four ports, including an input port 102, a drop port 104, an add port 106 and an output port 108. The external interface to the port is generally configured using an industry standard connector, such as small form factor pluggable module. Interface cords with connectors configured to mate with the connectors on the OADM module 100 are used to connect the OADM module 100 to an optical network and to other components existing on the optical network.

In one example, the OADM module 100 is connected to a communications panel 112 through an input interface cord 110. The communications panel 112 is in optical communication with the fiber optic network and transmits a multiplexed signal to the input interface cord 110. The input interface cord 110 is also connected to the module input connector 102. Internally, the module includes optical components that separate a single channel from the multiplexed signal. A drop interface cord 114 is connected to the drop port 104. The drop interface cord 114 is also connected to a network device 116, which may be a client computer or other device having need of data carried on channels from the multiplexed signal. The separated, or dropped, channel is supplied to the network device 116 through the drop interface cord 114. The network device 116 extracts the appropriate data from the dropped signal and returns, or adds, the dropped signal to the OADM module 100 through an add interface cord 118. The add interface cord 118 is coupled to the OADM module 100 via the add port connector 106.

Internal to the OADM module 100, the dropped signal is added to the multiplexed signal and transmitted via the output port 108 to the output interface cord 120. The output interface cord 120 is coupled to a communications panel 122, which may be the same communications panel 112 previously mentioned or a different communications panel. In either case, the communications panel 122 is coupled to the optical network and is configured to provide multiplexed signals to network devices. The OADM module 100 is usually mounted in a rack.

Typically the OADMs used in conventional optical networks are implemented using a physical infrastructure that is often bulky. For example, many OADMs are rack mounted in a case or a chassis. Thus, many optical networks only have a limited number of physical locations that are available for OADMs, namely those that can accommodate the physical size of the module. Another disadvantage of OADMs is that they typically involve the use of a relatively large number of connectors and associated cords, as described above in reference to FIG. 1, which also require significant physical space and manipulation.

BRIEF SUMMARY OF THE INVENTION

In one embodiment of the invention an optical add/drop patch cord is disclosed. The patch cord has optical fibers permanently or detachably connected to a casing that houses an optical add/drop component. The fibers are optically connected to the optical add/drop component. The patch cord provides flexibility and does not need to be mounted to a rack. The patch cord can be readily moved from one location to another location. Connections between ports can be quickly reconfigured using a patch cord.

In another embodiment, the patch cord has four optical fibers permanently connected to a casing that houses an optical add/drop component. The optical add drop component has an optical substrate with thin films mounted on opposing sides of the substrate. The thin films work together to provide the add/drop functionality. One of the thin film functions to pass or drop a particular wavelength or wavelengths of light while reflecting other wavelengths of light in a light signal toward the other thin film. The other thin film functions to combine or add the wavelength or wavelengths of light that are dropped by the first thin film with the wavelengths that are reflected by the first thin film. This accomplishes the add/drop functions of an OADM.

In one embodiment, the reduced size of a patch cord is useful in a variety of situations and locations including those with size constraints. The integrated design of the optical add/drop component reduces insertion losses due to the reduction in interconnections.

Additional features and advantages of embodiments the invention will be set forth in the description which follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 illustrates an add/drop module incorporated into the patch cord illustrated in FIG. 2; and.

DETAILED DESCRIPTION OF THE INVENTION

Embodiments of the present invention relate to an optical add/drop module that is integrated in a multiple-port patch cord. The patch cord and the integrated optical add/drop module are therefore contained in a single device that utilizes relatively little physical space when used in an optical network. Moreover, because the components are integrated, the number of separate components that would otherwise be required to perform add and drop operations on a wavelength division multiplexed optical signal are reduced. Embodiments of the optical patch cord permit network connections to be reconfigured quickly.

Figure 1:
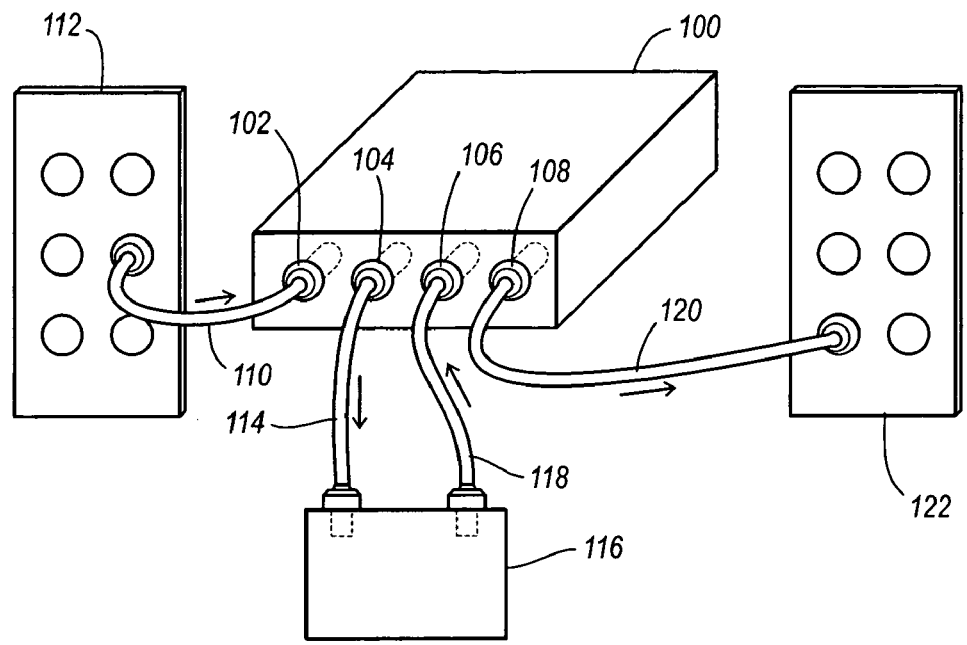
FIG. 1 illustrates a conventional optical add/drop module used with an optical network to add/drop a channel from an optical signal.
Figure 2:
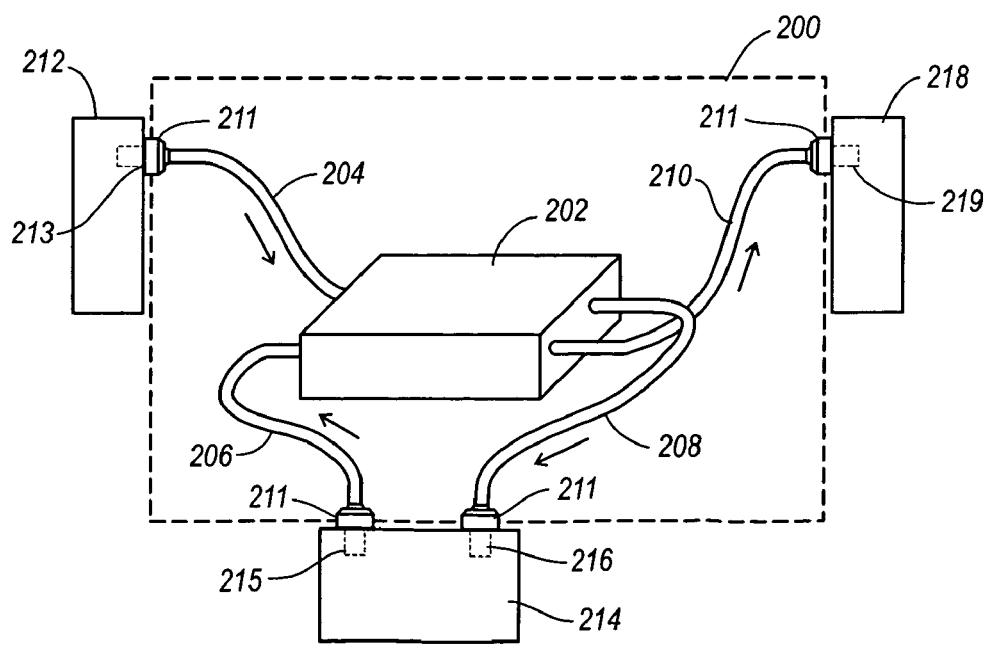
FIG. 2 is a perspective view of an exemplary optical add/drop patch cord.
Figure 3:
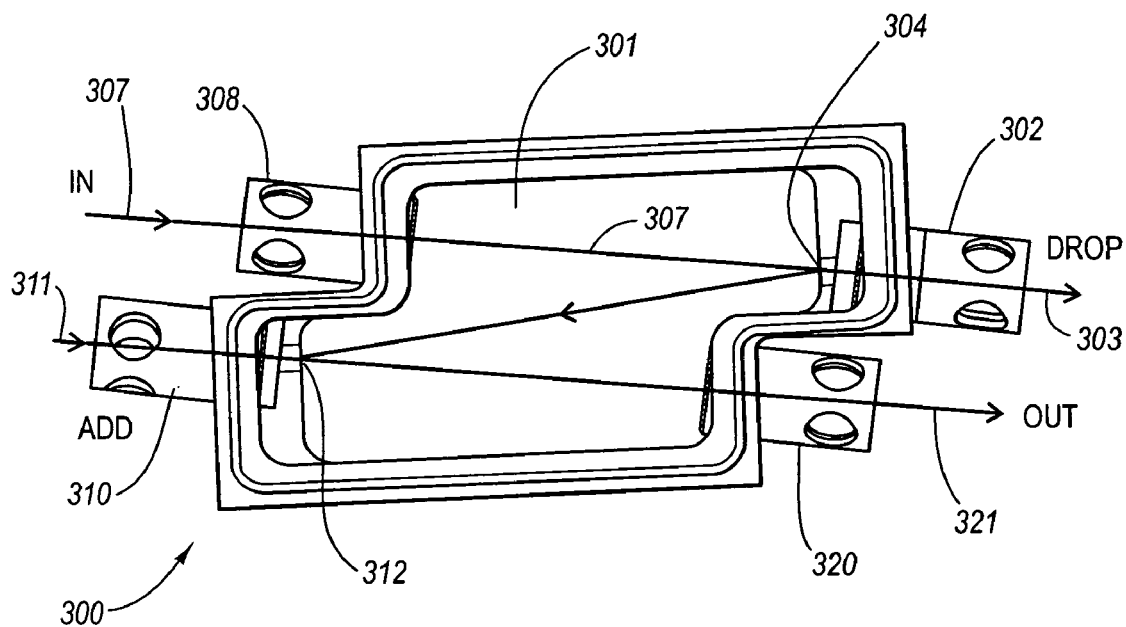

FIG. 2 illustrates one embodiment of a patch cord with an integrated optical add/drop module. The patch cord 200 is a four port patch cord in this example and has a casing 202 that encloses an optical add/drop component. The optical add/drop component is depicted in FIG. 3, which will be described below. Attached to the optical add/drop component enclosed by casing 202 are four fibers, including an input fiber 204, a drop fiber 208, an add fiber 206 and an output fiber 210. The four fibers may be permanently secured, in one embodiment, to the module casing 202 using at least one of a molded strain relief, epoxy, solder and the like. In another embodiment, the fibers 204, 206, 208, and 210 are detachably connected with the casing 202. The input fiber, drop fiber, add fiber and output fiber each include a connector 211. The connectors are configured such that they are detachably connectable with receptacles of standard form factors. The patch cord 200 is mobile and can be easily moved to another physical location or attached with different optical signals and ports.

In one illustrative deployment of the patch cord, the input fiber 204 is connected to a communications patch panel 212 using the connector 211 through a receptacle 213 that is disposed on the patch panel. A multiplexed signal from the communications network is available at the communications patch panel 212. In one embodiment, the multiplexed signal is a Coarse Wavelength Division Multiplexed (CWDM) signal that includes multiple channels. The multiplexed signal is transmitted into the input fiber 204, where it is propagated into the optical add/drop component that is disposed within the casing 202. The optical add/drop component separates, or drops, a single channel or wavelength from the multiplexed signal. In an embodiment with more than four ports, multiple signals can be added/dropped. Alternatively, more than one channel can be dropped at a particular port.

This dropped channel is propagated into the drop fiber 208. The drop fiber 208 propagates the dropped channel to a network device 214 or other network having need of the dropped channel. The drop fiber 208 is coupled to the network device 214 by connecting the connector 211 on the drop fiber 208 to a receptacle 216 on the network device 214. The connector 211 may be any common coupler form factor, such as a small form factor coupler, a small form factor pluggable coupler, or other connector. The network device 214 in this example may be a number of different components including, but not limited to, optical transceivers, transponders and other network elements.

The network device 214 extracts any needed data from the dropped channel and returns the dropped channel to the optical add/drop component enclosed by the casing 202 via the add fiber 206 that is connected to the network device 214 by connecting the connector 211 of the add fiber 206 to the receptacle 215 of the network device 214. Alternatively, the channel added via the fiber 206 may come from a source other than the network device 214. The optical add/drop component disposed in the module casing 202 returns, or adds, the dropped channel to the multiplexed signal. The fully reconstituted multiplexed signal is then propagated into the output fiber 210, where it can be further transmitted through the network. The output fiber 210 is coupled to a communications panel 218, which may be the same panel 212 described previously or some other communications panel. The output fiber 210 is equipped with a connector 211 of a standard form factor, such that it can interface with the communications panel 218 through rough a receptacle 219.

The embodiment shown in FIG. 2 allows for quick and efficient installation of a device for adding and dropping channels in a communications network. By embodying a device for adding dropped channels in a patch cord form factor, the device can be installed without the need to install large rack mounted equipment.

The patch cord 200 illustrated in FIG. 2 includes an optical add/drop module (OADM) connected with one or more optical fibers. Each optical fiber can have a length and the length of each optical fiber is not required to be the same. The end of each fiber opposite the end of the fiber connected to the optical add/drop module has a connector that can detachably connect with another optical signal source or receptacle.

One example of an OADM that is integrated with the patch cord is shown in FIG. 3. FIG. 3 generally shows an exemplary embodiment of an optical add/drop component, designated generally at 300. The optical add/drop component 300 includes an optical substrate 301. The optical substrate 301 may be any suitable optical substrate. Alternatively, the optical substrate 301 may be a number of optical substrates, with different indices of refraction or other characteristics that are optically connected. For example, the optical substrate 301 may include various combinations of glass and air. The optical substrate 301, near the drop port 302 has a thin film 304 formed thereon. When light enters the OADM 300 through the input port 308, the light is directed towards the drop port 302. The thin film 304 is configured such that one or more channels pass through the thin film, or are dropped from the input multiplexed signal, while the remaining channels of the input multiplexed signal are reflected towards the add port 310. Another thin film 312 is formed on the optical substrate 301 near the add port 310. The thin films 304 and 312 may be attached to the optical substrate by a vapor deposition process, a film growth process, or any other method that is suitable to create such thin films.

The thin film 304 is fabricated such that a particular wavelength or wavelengths will pass through the thin film 304 while all other wavelengths are reflected towards the thin film 312. The thin film 312 is configured to reflect all the wavelengths that were reflected by the thin film 304 towards the output port 320. In addition, the thin film 312 is configured to permit an add signal received through an add fiber 311 to pass through the thin film 312 and be combined with the signal or channels that are reflected by the thin film 312. Because the function of thin films is often reciprocal, the first thin film 304 and second thin film 312 may be identical. The multiplexed signal 307, for example, is a CWDM signal that includes eight channels in one embodiment. The multiplexed signal 307 enters the input port 308. The input port 308 may comprise a solder ferrule that has been arranged such that an input fiber 204 can be soldered or otherwise connected to the input port 308. The input fiber is soldered to the input port 308 and focused such that the input multiplexed signal 307 continues propagating undisturbed until it contacts the first thin film 304. At this point, the channel, or wavelength for which the thin film 304 has been selected, passes through the thin film and propagates through a drop port 302 into a drop fiber 303. The drop port 302 may be a solder ferrule or other type of connection. The drop fiber 303 is connected to the drop port 302 so as to obtain efficient light transfer. The remainder of the multiplexed signal 307 is reflected toward the second thin film 312. When the remainder of the multiplexed signal 307 contacts the thin film 312, the signal is reflected toward an output port 320 that may be coupled to an output fiber 321. The output port 320 may also be a solder ferrule or other type of connection as described above. The output fiber 321 is connected to the output port 320 so as to obtain efficient transfer of the multiplexed light. As shown in FIG. 3, the dropped channel(s) of the multiplexed signal 307 are added to the multiplexed signal 307 through the add port 310 via an add fiber 311 that has been connected to the add port 310 and focused to obtain efficient light transfer, where it is added to the multiplexed signal and directed to the output port 320. The OADM 300 may also include collimating elements to ensure that the light beam is not dispersed within the OADM 300. Alternatively, the OADM 300 may include optical waveguides and other optical elements to direct the light to reduce dispersion problems and or excessive signal loss.

Figure 4:
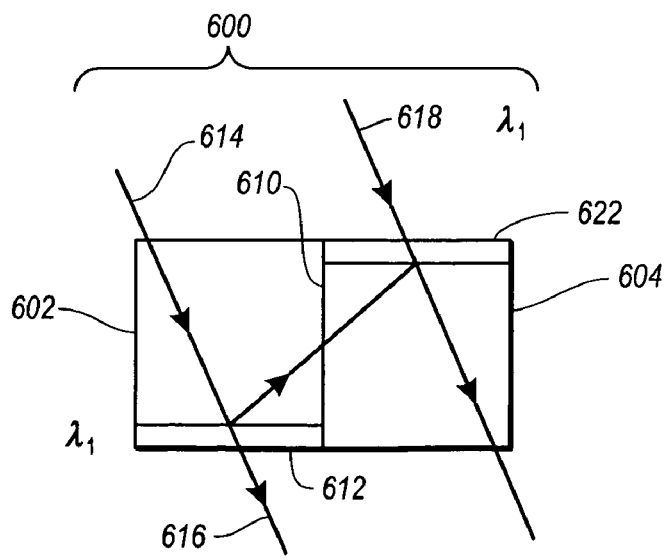
FIG. 4 illustrates an optical add/drop module fabricated using a batched package process.

In one embodiment of the invention, the OADM 300 may be constructed using a batched packaging process. Referring now to FIG. 4, a method of constructing an add/drop module, designated generally as 600, using the batched package process is shown. The add/drop module is constructed from two cubes 602 and 604. While these components are referred to herein as "cubes", their geometries are not limited to having six equal sides. As used herein, the term "cube" extends to any structure that can be diced from an optical substrate in the manner described herein. The cubes may have been manufactured such as by depositing a thin film on an optical substrate and dicing the optical substrate. In this example, the thin films 612 and 622 on the cubes 602 and 604 are identical. In another embodiment, the thin films 612 and 622 are different and have different optical characteristics. The attachment faces 610 of the cubes 602 and 604 are usually polished to substantially remove all irregularities and impurities such that the cubes 602 and 604 will adhere together naturally. In one embodiment, the cube 602 is pressed together with the cube 604. Before pressing the cubes together, the cubes 602 and 604 are arranged such that the thin film 612 is diagonally opposed to the thin film 622 as shown in FIG. 4. Arranging the cubes in this manner permits the optical signal to be reflected from the thin film of a first cube to the thin film of the next cube. Each thin film is configured to act on the light in a particular manner. If, for example, a channel is being dropped, then the thin film is configured to let that channel pass through the thin film while reflecting all other films, or vice versa. The cubes 602 and 604 are then pressed together at their attachment faces 610 such that the cubes fuse together at the attachment faces 610 of the cubes 602 and 604.

In one embodiment, a multiplexed signal 614 is input into the first cube 602 of the add/drop module 600. The multiplexed signal 614 travels towards the thin film 612 disposed on the cube 602. When the multiplexed signal 614 contacts or impinges the thin film 612, a single wavelength, for which the thin film has been designed, passes through the thin film 612 and into a drop path 616. The remaining channels of the multiplexed signal are reflected to the second cube 604 towards the thin film 622. When these channels contact the second thin film 622 of the second cube 604, they are reflected to an output path. This accomplishes a drop functionality. The add functionality is achieved by adding the dropped signal back to the multiplexed signal through an add path 618. Accordingly, the functionality of an optical add/drop module is accomplished. In this example, the thin films 612 and 622 are the same, thus, the channel carried by the add path 618 will pass through the thin film 622 and combine with the multiplexed signal 614.

FIG. 4 illustrates one embodiment of the optical substrate 301 shown in FIG. 3. One of skill in the art can appreciate that the cubes illustrated in FIG. 3 can be adapted for optical functionality in addition to OADMs. The optical substrate can be configured such that the patch cord may function as a multiplexer or a demultiplexer. Tap functionality can also be implemented using appropriate films on the optical substrate. By adding additional cubes with appropriate films, ports can be added to a patch cord.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An optical add/drop patch cord comprising:
an optical add/drop component disposed in a casing, the optical add/drop component comprising:
an optical substrate;
a first thin film formed on a first end of the optical substrate; and
a second thin film formed on a second end that opposes the first end;
an input fiber permanently coupled to the casing with a first connector and optically coupled to the optical add/drop component, the input fiber including a second connector attached to an end of the input fiber;
a drop fiber permanently coupled to the casing with a third connector and optically coupled to the optical add/drop component, the drop fiber including a fourth connector attached to an end of the drop fiber;
an add fiber permanently coupled to the casing with a fifth connector and optically coupled to the optical add/drop component, the add fiber including a sixth connector attached to an end of the add fiber; and
an output fiber permanently coupled to the casing with a seventh connector and optically coupled to the optical add/drop component, the output fiber including an eighth connector attached to an end of the output fiber;
wherein the second, fourth, sixth, and eighth connectors enable the optical add/drop component to connect ports of a patch panel in multiple configurations;
wherein the first thin film is configured to allow at least one wavelength of an optical signal from the input fiber to pass through the first thin film towards the drop fiber while reflecting other wavelength(s) of the optical signal to the second thin film; and
the second thin film is configured to reflect the other wavelength(s) of the optical signal towards the output fiber while allowing at least one wavelength to pass through the thin film from the add fiber towards the output fiber.

2. The optical add/drop patch cord of claim 1, the optical substrate comprising:
a first cube having a first attachment face; and
a second cube having a second attachment face that is adhered to the first face when pressed together.

3. The optical add/drop patch cord of claim 1, wherein the input, drop, add and output fibers are coupled to the optical add/drop component using solder ferrules.

4. The optical add/drop patch cord of claim 1, the optical add/drop component including the collimating elements for ensuring that light is not dispersed within the optical add/drop component.

5. The optical add/drop patch cord of claim 1, the optical substrate including a combination of glass and air.

6. An optical add/drop patch cord comprising:
a casing;
an input fiber secured to the casing with a first connector, the input fiber including a second connector attached to an end of the input fiber;
a drop fiber secured to the casing with a third connector, the drop fiber including a fourth connector attached to an end of the drop fiber;
an add fiber secured to the casing with a fifth connector the add fiber including a sixth connector attached to an end of the add fiber;
an output fiber secured to the casing with a seventh connector, the output fiber including a eighth connector attached to an end of the output fiber, wherein the second, fourth, sixth, and eighth connector enable the input fiber, drop fiber, add fiber, and output fiber to be connected to ports of a panel in multiple configurations; and
an optical add/drop component disposed in the casing, the optical add/drop component comprising:
an optical substrate;
a first thin film formed on a first end of the optical substrate; and
a second thin film formed on a second end such that the second thin film is opposed to the first thin film;
an input port optically coupled to the optical substrate and arranged to propagate a multiplexed optical signal towards the first thin film;
a drop port optically coupled to the first thin film and arranged to receive at least one wavelength of the multiplexed signal from the first thin film;
an add port coupled to the second thin film and arranged to allow at least one wavelength to pass through the add port and into the second thin film; and
an output port coupled to the optical substrate and configured to receive signals from the second thin film.

7. The optical add/drop patch cord of claim 6, wherein:
the input fiber is permanently secured to the casing and optically coupled to the input port;
the drop fiber is permanently secured to the casing and optically coupled to the drop port;
the add fiber is permanently secured to the casing and optically coupled to the add port; and
the output fiber is permanently secured to the casing and optically coupled to the output port.

8. The optical add/drop patch cord of claim 6, wherein:
the input fiber is detachably secured to the casing and optically coupled to the input port of the optical add/drop component;
the drop fiber is detachably secured to the casing and optically coupled to the drop port;
the add fiber is detachably secured to the casing and optically coupled to the add port; and
the output fiber is detachably secured to the casing and optically coupled to the output port.

9. The optical add/drop patch cord of claim 6, wherein the input port, output port, add port and drop port each comprise a solder ferrule.

10. The optical add/drop patch cord of claim 6, wherein:
the first thin film is configured to allow at least one wavelength of an optical signal from the input port to pass through the first thin film towards the drop port while reflecting other wavelength(s) of the optical signal to the second thin film; and
the second thin film is configured to reflect the other wavelength(s) of the optical signal towards the output port while allowing at least one wavelength to pass through the thin film from the add port towards the output port.

11. A method for manufacturing an optical add/drop patch cord comprising:
attaching a first connector to a first end of an input fiber and a second connector to a second end of the input fiber;
attaching a third connector to a first end of a drop fiber and a fourth connector to a second end of the drop fiber;
attaching a fifth connector to a first end of an add fiber and a sixth connector to a second end of the add fiber;

attaching a seventh connector to a first end of an output fiber and an eighth connector to a second end of the output fiber, wherein the second, fourth, sixth, and eighth connector are configured to connect with ports of a panel in multiple configurations;

securing each fiber to a casing;

enclosing an optical add/drop component in the casing, the optical add/drop component comprising:

an optical substrate;

a first thin film formed on one end of the substrate; and a second thin film formed on an end opposing the one end such that the second thin film is opposed to the first thin film;

optically coupling an input port to the optical substrate whereby a signal input at the input port will travel towards the first thin film;

optically coupling a drop port to the optical substrate at the first thin film whereby a signal passing through the first thin film will propagate through the drop port and a signal reflected by the first thin film will be reflected towards the second thin film;

optically coupling an add port to the optical substrate at the second thin film whereby the second thin film is configured to reflect the signals reflected by the first thin film towards an output port and to permit a signal received by the add port to pass through the second thin film towards the output port; and optically coupling the output port to the optical substrate.

12. The method of claim 11, further comprising:

soldering the input fiber to the input port;

soldering the drop fiber to the drop port;

soldering the add fiber to the add port; and soldering the output fiber to the output port.

13. The method of claim 11, further comprising constructing the add/drop module wherein constructing comprises:

arranging two thin film cubes having thin film substrates such that the thin films are diagonally opposed to each other; and pressing the two thin film cubes together to cause the two thin film cubes to fuse.

14. The method of claim 13, further comprising polishing attachment faces on the thin film cubes where the two thin film cubes will be fused to remove irregularities and impurities.

15. The method of claim 11, comprising forming at least one of the first thin film and the second thin film on the optical substrate by a vapor deposition process.

16. The method of claim 11, comprising forming at least one of the first thin film and the second thin film on the optical substrate by a film growth process.

17. The method of claim 11, further comprising:

detachably securing the input fiber to the casing and optically coupling the input fiber to the input port;

detachably securing the drop fiber to the casing and optically coupling the drop fiber to the drop port;

detachably securing the add fiber to the casing and optically coupling the add fiber to the add port; and detachably securing the output fiber to the casing and optically coupling the output fiber to the output port.

18. The method of claim 11, further comprising:

permanently securing the input fiber to the casing and optically coupling the input fiber to the input port;

permanently securing the drop fiber to the casing and optically coupling the drop fiber to the drop port;

permanently securing the add fiber to the casing and optically coupling the add fiber to the add port; and permanently securing the output fiber to the casing and optically coupling the output fiber to the output port.

* * * * *